R. W. ZIMMERMAN.
PRESSURE GAGE.
APPLICATION FILED JAN. 25, 1915.
1,288,370.
Patented Dec. 17, 1918.
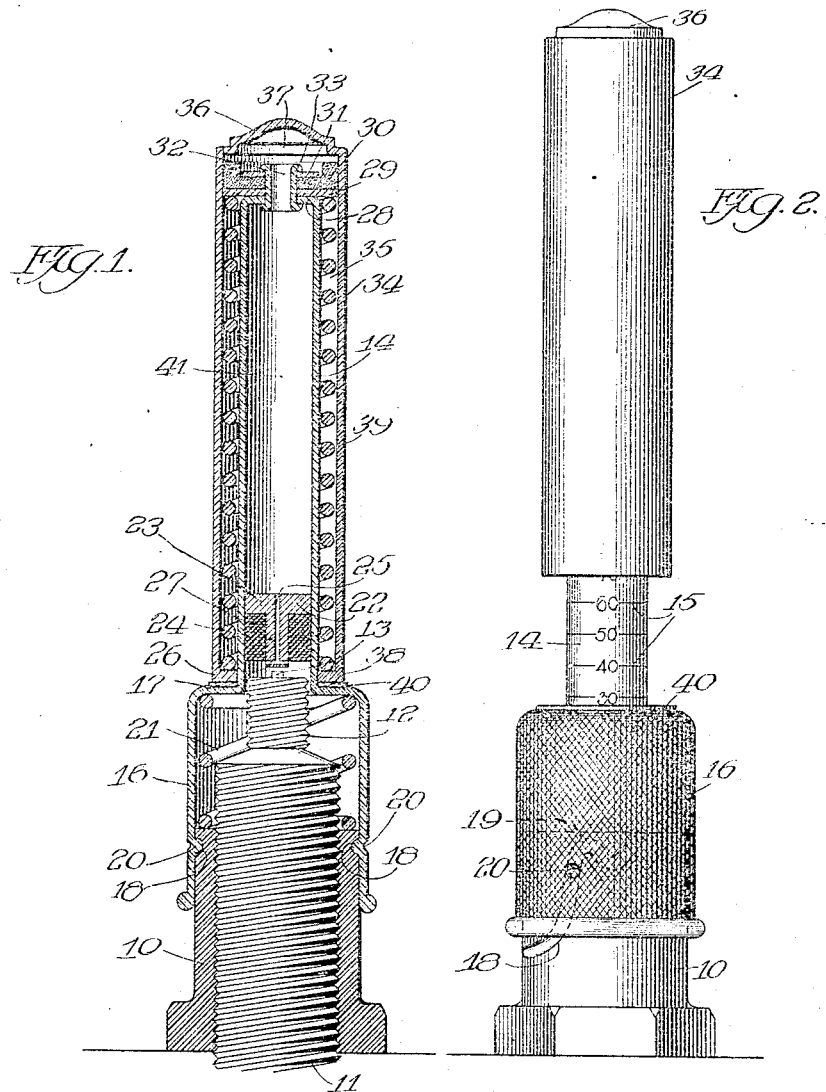
WITNESSES
INVENTOR.
Ralph W. Zimmerman
BY
ATTORNEY

UNITED STATES PATENT OFFICE.

RALPH W. ZIMMERMAN, OF CHICAGO, ILLINOIS, ASSIGNOR OF ONE-FOURTH TO EDWIN C. LOOMIS AND THREE-EIGHTHS TO ALBERT M. SAXE, BOTH OF CHICAGO, ILLINOIS.

PRESSURE-GAGE.

1,288,370.  Specification of Letters Patent.  Patented Dec. 17, 1918.

Application filed January 25, 1915. Serial No. 4,149.

*To all whom it may concern:*

Be it known that I, RALPH W. ZIMMERMAN, a citizen of the United States, residing at Chicago, in the county of Cook and State of Illinois, have invented certain new and useful Improvements in Pressure-Gages, of which the following is a specification.

My invention relates to pressure gages, and refers particularly, although not exclusively, to pressure gages adapted to be used for determining the pressure in pneumatic tires.

I am aware that in the past it has been common to employ pressure gages to determine the pressure in pneumatic tires. The object of my invention is to provide various improvements in connection with pressure gages in order to render them cheaper to manufacture and more efficient in operation, particularly with respect to their use in connection with pneumatic tires.

A further object of my invention consists in so constructing the pressure gage that the operating parts immediately associated with the indicating mechanism are efficiently protected from dirt and dust so that the operation of the gage will be accurate at all times.

A still further object of my invention consists in the provision of suitable mechanism so that the pressure gage may be permanently connected with the valve stem of a tire and take the place of the ordinary valve cap commonly in use. The pressure gage is in this way available for use at all times, and may be readily brought into operation to indicate the pressure by a simple manipulation, which will be described hereafter. The parts are so designed that the pressure gage may be readily removed when it is desired to pump up the tire.

These and other advantages of my invention will be more readily understood by reference to the accompanying drawings, in which—

Figure 1 is a longitudinal section through my improved pressure gage, shown as applied to an automobile tire valve; and, Fig. 2 is an elevation of the parts shown in Fig. 1, the pressure gage having been moved into operative position.

The base member 10 is permanently connected with the threaded valve stem 11, of the usual and well-known type which is used for automobile tires. The base member 10, is brought firmly into engagement with the rim of the wheel, and remains permanently in position, except when it is removed for the purpose of changing a tire, in which case the valve stem 11 is withdrawn through the rim of the wheel in a well-known manner. The valve stem 11 is provided with the threaded upper portion 12, of restricted diameter, for the purpose of receiving a coupling member when it is desired to introduce air into the tire through the valve stem. The valve rod 13 projects slightly from the open end of the restricted portion 12 of the valve stem, and is connected with the usual type of valve used in this connection; on moving the valve rod 13 inwardly the valve is unseated, thereby allowing air to escape from the tire through the open end of the restricted portion 12 of the valve stem 11.

The gage member of my pressure gage consists of a tubular member or hollow casing 14, having on its outer surface the gage marks 15, in connection with which are provided suitable numbers to indicate the pressure of air within the tire, in a manner which will be explained hereafter. At its lower or inner end the gage member 14 is expanded to form the skirt member 16, the shoulder 17 being formed between the gage member 14 and the skirt member 16. The skirt member 16 is of just sufficient diameter to fit over the base member 10. The base member 10 is provided with a pair of grooves 18, one of these grooves being indicated in Fig. 2. It will be evident that each of these grooves extends from the upper edge of the base member 10 in a downward or inward direction, and then extends for a short distance in an upward or outward direction, thereby forming the portion 19 of the groove 18, after which said groove 18 extends in a downward or inward direction at the same time extending laterally approximately one-quarter of the distance around the base member 10. Although only one of the grooves 18 is shown in Fig. 2, it will be evident that a second groove of exactly the same type is provided on the opposite side of the base member 10, as clearly indicated in Fig. 1. The skirt member 16 is provided with a pair of inwardly extending lugs or pins 20 which engage the grooves 18. Between the upper or outer edge of the base member 10 and the shoulder 17 is placed the compression spring 21, the tendency of which is to move the skirt member 16 and the gage member 14 in an outward direction.

Near the lower end of the gage member 14 is fastened the opener 22, which consists of a transverse wall 23 fitted within the gage member 14, and an extension 24. A passage 25 passes through the extension 24 and the wall 23, and at its lower or inner end connects with the passage 26 extending transversely through the end of the extension 24. A rubber gasket 27 incloses the extension 24 and fills the space between said extension and the inner surface of the gage member 14.

The upper or outer end of the gage member 14 is preferably bent inwardly to form the flange 28. The metallic washer 29 engages the outer end of the gage member 14 and supports the leather washer 30, which, on its opposite side, is engaged by the metallic washer 31, the metallic washers 29 and 31 and the leather washer 30 being securely held in position by the short connecting tube 32 which has the flanges 33 on its ends, these flanges engaging, respectively, the flange 28 of the gage member 14 and the metallic washer 31.

The gage member 14 is inclosed by the sleeve 34, an annular space 35 being left between the outer surface of the gage member 14 and the inner surface of the sleeve 34. The sleeve 34 is closed at its outer end by the end member 36 so that a pressure chamber 37 is provided between the short connecting tube 32 and this end member 36. The leather washer 30 engages the inner surface of the sleeve 34, thereby making an air-tight partition between the pressure chamber 37 and the annular chamber 35.

The lower or inner end of the sleeve 34 is provided with the inwardly-extending flange 38, which engages the outer surface of the gage member 14. A compression spring 39 is located in the annular space 35 and engages at one end the flange 38 and at the opposite end the metallic washer 29. The outer portion of the shoulder 17 between the gage member 14 and the skirt 16 carries a gasket 40, of leather or other similar material, so that when the sleeve 34 is in its normal position, as indicated in Fig. 1, dust, water, and the like are effectually prevented from entering the annular space 35 and so interfering with the operation of the gage.

Having thus described the various parts which are used in my invention, the operation of the same may now be readily understood.

My improved pressure gage when used in connection with an automobile or other pneumatic tire is designed to be permanently connected with the tire, and, as pointed out above, is intended to replace the usual cap used for the valve stem. In normal position, the various parts are as shown in Fig. 1. The lugs or pins 20 of the skirt 16 are in the portions 19 of the grooves 18, and the pressure gage is held in this position by means of the spring 21, which normally tends to move the skirt 16 and the associated parts in an outward direction. It will now be evident that inasmuch as the inner end of the sleeve 34 engages the gasket 40 no water or dust can reach the operating parts of the gage, and for this reason the gage may remain indefinitely in position on an automobile wheel without injurious effect.

When it is desired to determine the pressure of air in the tire the skirt 16 is rotated so that the lugs or pins 20 are moved inwardly along the grooves 18 until these lugs occupy, for example, the position shown in Fig. 2. By reason of the inward movement of the various parts of the gage the extension 24 of the opener 22 is brought into engagement with the valve rod 13, thereby causing the valve to become unseated. At the same time the outer edge of the portion 12 of the valve stem is engaged by the rubber gasket 27 with an even pressure on account of the bearing of the skirt member 16 on the base member 10. The skirt member 16 is rotated and moved inwardly until a snug engagement is formed between the gasket 27 and the outer edge of the portion 12. Air meanwhile escapes from the tire and passes through the passages 26 and 25 into the connecting chamber 41 within the gage member 14. The air then continues through the short connecting tube 32 into the pressure chamber 37. The pressure of the air against the end member 36 of the sleeve 34 causes the latter to be moved outwardly against the tension of the spring 39. The extent of this movement is, of course, determined by the pressure of the air, and this pressure may be accurately ascertained by the position of the inner end of the sleeve 34 with respect to the gage marks 15 on the gage member 14.

After the reading has been taken the skirt member 16 is moved back to its former position in which the lugs or pins 20 engage the portions 19 of the grooves 18. If it is desired to remove the pressure gage in order to obtain access to the valve stem for the purpose of pumping up the tire, the skirt 16 is rotated so that the lugs or pins 20 of the skirt member are entirely disengaged from the upper or outer ends of the grooves 18.

It will be apparent to those skilled in the art that many changes could be made in the detailed construction of the parts which I have described without departing from the spirit or scope of my invention.

What I claim is:

1. In a pressure gage, the combination of a hollow casing, means carried by said casing for indicating the pressure within said casing, a skirt attached to said casing, a base member in telescopic engagement with said skirt, said base member adapted to engage a tire valve stem, and coöperating means on the exterior of said base member and the interior of said skirt, whereby on rotation of said skirt the casing is moved into operative position with the air valve.

2. In a pressure gage, the combination of a hollow casing, means carried by said casing for indicating the pressure within said casing, a skirt attached to said casing, a base member in telescopic engagement with said skirt, said base member adapted to engage a tire valve stem, guide means on the exterior of said base member and the interior of said skirt, whereby on rotation of said skirt the latter is given longitudinal movement with respect to said base member, and spring means normally tending to move said skirt outwardly with respect to said base member.

3. In a pressure gage, the combination of a hollow casing means carried by said casing for indicating the pressure within said casing, a skirt attached to said casing, a base member in telescopic engagement with said skirt, said base member adapted to engage a tire valve stem, a base member having a guide groove therein, said guide groove extending from the outer edge of said base member inwardly and then having a portion extending toward said edge and finally a portion again extending inwardly and around said base member, means on said skirt for engaging said groove, and spring means tending to move said skirt outwardly with respect to said base member, whereby when said engaging means on said skirt engages the outwardly extending portion of said groove said skirt will be permanently held in position.

4. In a tire pressure gage, the combination of a hollow casing, means carried by said casing for indicating the pressure within said casing, a skirt attached to said casing, a base member in telescopic engagement with said skirt, said base member adapted to engage a tire valve stem, means carried by said casing for opening a tire valve when the gage is applied to the valve stem, and guide means on the exterior of said base member and the interior of said skirt, whereby on rotation of said skirt the latter is given downward longitudinal movement with respect to said base member, and said valve-opening means will be simultaneously moved to open the tire valve.

5. In a pressure gage, the combination of a hollow casing open at each end, a sleeve inclosing said casing and spaced away therefrom, said sleeve being closed at its outer end, packing means to interrupt communication between the inside of said casing and the space between said casing and said sleeve, and spring means between the casing and the sleeve surrounding the casing and bearing against the ends of the sleeve and the casing, whereby a fluid passing through said casing into engagement with the closed end of said sleeve will move the latter against the tension of said spring for a distance proportional to the pressure of said fluid.

6. In a pressure gage, the combination of a hollow casing open at each end, a sleeve inclosing said casing and spaced away therefrom, said sleeve being closed at its outer end, packing means to interrupt communication between the inside of said casing and the space between said casing and said sleeve, spring means between the casing and the sleeve surrounding the casing and bearing against the ends of the sleeve and the casing, whereby a fluid passing through said casing into engagement with the closed end of said sleeve will move the latter against the tension of said spring for a distance proportional to the pressure of said fluid, and means for sealing communication between said casing and said sleeve when said sleeve is in its normal position.

7. In a pressure gage, the combination of a hollow casing open at each end, a sleeve inclosing said casing and spaced away therefrom, said sleeve being closed at its outer end, packing means to interrupt communication between the inside of said casing and the space between said casing and said sleeve, spring means in the space between said casing and said sleeve and engaging opposite ends of the same, whereby a fluid passing through said casing into engagement with the closed end of said sleeve will move the latter against the tension of said spring a distance proportional to the pressure of said fluid, a skirt integral with said casing and of greater diameter than the latter, whereby a shoulder is formed between said casing and said skirt, and sealing means carried by said shoulder and engaged by the inner end of said sleeve when the latter is in its normal position.

8. In a pressure gage, the combination of a hollow casing open at each end, a sleeve inclosing said casing and spaced away therefrom, said sleeve being closed at its outer end, packing means to interrupt communication between the inside of said casing and the space between said casing and said sleeve, spring means in the space between said casing and said sleeve and engaging opposite ends of the same, whereby a fluid passing through said casing into engagement with the closed end of said sleeve will move the latter against the tension of said spring a distance proportional to the pressure of said fluid, a skirt integral with said casing and of greater diameter than the latter, whereby a shoulder is formed between said casing and said skirt, sealing means carried by said shoulder and engaged by the inner end of said sleeve when the latter is in its normal position, and a base member, said sleeve having telescopic engagement with said base member and adapted to be applied to a tire valve stem, and the casing adapted to open the tire valve when moved downwardly over the base member.

9. In a pressure gage, the combination of a hollow casing open at each end, a sleeve inclosing said casing and spaced away therefrom, said sleeve being closed at its outer end, packing means to interrupt communication between the inside of said casing and the space between said casing and said sleeve, spring means in the space between said casing and said sleeve and engaging opposite ends of the same, whereby a fluid passing through said casing into engagement with the closed end of said sleeve will move the latter against the tension of said spring a distance proportional to the pressure of said fluid, a skirt integral with said casing and of greater diameter than the latter, whereby a shoulder is formed between said casing and said skirt, sealing means carried by said shoulder and engaged by the inner end of said sleeve when the latter is in its normal position; a base member; said sleeve having telescopic engagement with said base member and the latter adapted to be applied to a tire valve stem, spring means between said base member and said skirt normally tending to separate the same, means for holding said skirt in position against the pressure of said spring, and the casing provided with means for opening a tire valve when moved thereagainst.

10. In a pressure gage, the combination of a hollow casing, means carried by said casing for indicating the pressure within said casing, a skirt member attached to said casing, a base member in telescopic engagement with said skirt member, an obliquely-disposed guide groove in one of said members, said groove having an angular portion therein adapted to maintain said casing in inoperative position, groove-engaging means carried by the other of said members, and spring means within the skirt member normally tending to move said skirt member outwardly with respect to said base member, whereby said skirt member is retained in position by said spring means when said angular portion of the guide groove is engaged by said groove-engaging means.

In witness whereof I hereunto subscribe my name this 14th day of January, A. D. 1915.

RALPH W. ZIMMERMAN.

Witnesses:
HENRY M. HUXLEY,
L. E. HANNEN.

Copies of this patent may be obtained for five cents each, by addressing the "Commissioner of Patents, Washington, D. C."

Correction in Letters Patent No. 1,288,370.

It is hereby certified that in Letters Patent No. 1,288,370, granted December 17, 1918, upon the application of Ralph W. Zimmerman, of Chicago, Illinois, for an improvement in "Pressure-Gages," an error appears in the printed specification requiring correction as follows: Page 4, line 4, claim 8, after the word "and" insert the words *said base member;* and that the said Letters Patent should be read with this correction therein that the same may conform to the record of the case in the Patent Office.

Signed and sealed this 28th day of January, A. D., 1919.

[SEAL.]

R. F. WHITEHEAD,

*Acting Commissioner of Patents.*

Cl. 73—111.